Nov. 21, 1967   P. FATOVIC   3,354,373
FIXTURE FOR USE DURING THE POLARIZATION OF AN ELECTRET
Filed May 14, 1964

INVENTOR
PETER FATOVIC
Curphey & Erickson
AGENT

United States Patent Office 3,354,373
Patented Nov. 21, 1967

3,354,373
FIXTURE FOR USE DURING THE POLARIZATION OF AN ELECTRET
Peter Fatovic, Ottawa, Ontario, Canada, assignor to Northern Electric Company Limited, Montreal, Quebec, Canada
Filed May 14, 1964, Ser. No. 367,517
10 Claims. (Cl. 320—1)

ABSTRACT OF THE DISCLOSURE

This invention is a fixture which is used during the polarization process of electret material. The material is contained free from wrinkling, stretching, and other damage, and protection from short circuiting of polarization electrodes is afforded. This invention consists of two planar electrodes for containing electret material between them. A sheet of dielectric material is interposed between an electrode and the electret material, having a dielectric constant greater than that of the electret material, in order to concentrate the electric field across the electret.

---

This invention relates to apparatus for use during the polarization of a dielectric to form an electret.

It has been known for considerable time that certain dielectric materials may be permanently electrostatically polarized and so form electrets. Only in recent years has it been possible to form commercially usable electrets. For instance, an electret in sheet or film form may be used as the diaphragm in a condenser microphone; the polarization of the electret obviating any requirement for an external biasing source for the condenser element. The creation of thin sheets depended upon the discovery in the art that certain stable synthetic easily worked materials, for instance polyethylene terephthalate (sold under the trade mark Mylar), polyethelene or cellulose nitrate, cellulose acetate, cellulose acetobutyrate, dichloroethylene polysulphide, benzylcellulose and polymers of vinyl acetate, possess the capability of forming electrets.

It is well known that in order to polarize these polarizable dielectric materials, herein referred to as electret material, it is necessary to (a) excite the material, for instance by heating to a forming temperature, (b) apply an electric field, and (c) allow the electret material to cool under the influence of the electric field. At this point, the electric field may be removed, and the electret material will have been formed into the electric analog of a permanent magnet: an electret.

A discussion on electrets may be found in the following references: B. Gross, "Experiments on Electrets," Physical Review, vol. 66, pages 26 to 28, July 1 to 15, 1944; W. F. G. Swann, "Certain Matters Pertaining to Electrets," Journal Franklin Institute, vol. 250, pages 219 to 248, September 1950; A. N. Gubkin, "The Phenomenological Theory of Electrets," Soviet Physics-Technical Physics, vol. 2, No. 9, pages 1813 to 1824, 1957; Thiessen, Winkel and Herrmann, "Dielectric After-effect in Solidified Dielectrics," Phgs. Zeits, vol. 37, pages 511 to 520, July 15, 1936; B. Gross, "Permanent Charges in Solid Dielectrics II—Surface Charges and Transient Currents in Carnauba Wax," Journal of Chem. Phys., vol. 17, No. 10, pages 866 to 872, October 1949; and "Electrets, their Mechanism and Potentialities" by Dr. Andrew Gemant, in Direct Current, September 1953, pages 145 to 147.

The problem of forming an electret out of sheet electret material becomes more acute as the thickness of the material decreases. For instance, it is sometimes desired to polarize electret material comprising ¼ mil. thick Mylar sheet. In this case, a unidirectional electric field of the order of 15,000 volts per centimeter must be applied across the thickness of the sheet at an ambient temperature of the order of 120° C. It may readily be appreciated that two electrodes applied to opposite surfaces of the sheet in such manner as to keep the sheet in a wrinkled-free condition may well short circuit through the sheet due to microscopic sharp protuberances on the electrodes.

It may be desirable to eliminate wastage of the electret material due to non-homogeneous polarization around the edges of the electrodes should the electret material have a larger surface area than the electrodes. However, if the electrodes are made larger than the piece of electret material, a short circuit, arcing or current leakage bypassing the electret material through the air can easily occur outside of the edges of the material due to the extremely close spacing and high electric field strength between the electrodes.

It may also be seen that should the electrodes be spaced any substantial distance from the electret material, a large potential gradient will occur in the air gap separating the sheet from the electrodes. This would result in a substantially smaller electret polarizing field effectively applied across the thickness of the sheet itself, thus requiring a substantially higher potential applied across the electrodes. In addition, because of the surface charge on the electret material, and its polarizable nature, the electret will be attracted to one or both electrodes, resulting in a wrinkled and non-linearly polarized electret. If efforts are made to maintain the material under tension a distance from the electrodes, the heat required during the polarizing process causes the material to deform, sag, or wrinkle. The stretching and deforming problem is compounded should the electret material be covered with an adherent metal film. When the electret sheet stretches or contracts the metal film breaks, bubbles, or peels.

I have invented a fixture for use during the process of polarizing an electret material which greatly reduces the possibility of short circuiting, arcing, or current leakage through the air outside the area between the electrodes, eliminates stretching of the electret material, ensures a high polarizing electric field across the sheet and allows the formation of electrets having large surface areas to my knowledge previously not possible. In addition, my invention is relatively inexpensive and is conducive to mass production of electrets.

My fixture for polarizing electret material comprises two electrodes adapted to sandwich electret material therebetween, and insulating means separating the electret material from one electrode, the insulating means completely covering one side of the electret material between the electrodes.

It may therefore be seen that the electret material is held rigid and stationary and suffers substantially no stretching between the electrodes. The insulating means separates the electrodes so as to prevent short circuits and the possibility of arcing, and therefore minute pieces of electrode material or insulating material which may pierce the electret material will not cause short circuiting between the electrodes.

In addition it is believed that the use of my invention (a) creates a substantially homogeneous electrostatic field in the electret film, (b) protects the electret film from dust particles attracted by any electrostatic charge thereon, (c) is an excellent storage means for the resulting electret prior to its use, (d) does not impose a limit on the shape of the sheet being polarized, (e) does not apply excessive pressure at any point on the Mylar film, which reduces the possibility of pressure-caused punctures and deformation, (f) is of relatively small mass thus enhancing even temperature distribution, and (g) is easily handled and operated.

In more preferred embodiments of my invention, the insulating means has sufficient area so as to lengthen the leakage path around the edge of the insulating means through air from one electrode to the other. In another, the insulating means comprises two plates, each disposed between the electret material and one electrode so as to equalize the expansion rates on each side of the electret material and thus virtually eliminate warpage due to heat. The insulating means preferably comprises insulating material having a larger dielectric constant than the electret material, to maximize the potential gradient across the electret material.

I will herein describe my invention with reference to the case where the electret material is a thin film sheet, say, of the order of ¼ mil thick. However, my invention can be used during the polarization of electret material which is not in sheet form and advantages thereof still be accrued. This will be readily apparent to one skilled in the art understanding my invention.

My invention will be better understood by referring to the drawings and further description given below:

Figure 1:
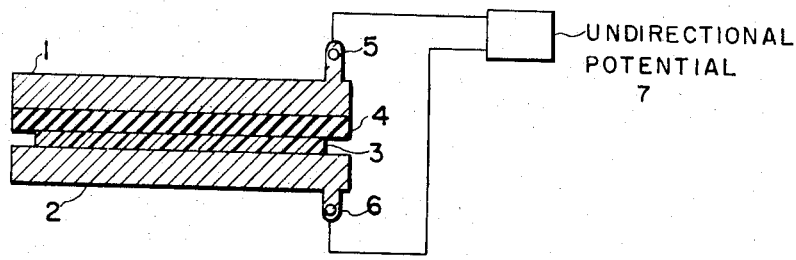
FIG. 1 shows a sectional view of the simplest form of my invention.

FIG. 1 shows the basic elements of the simplest form of my invention, comprising a fixture having electrodes 1 and 2 sandwiching electret material 3, and insulating means 4 separating the electret material 3 from the electrode 1. Terminals 5 and 6 of the electrodes 1 and 2 are connected to a unidirectional source of potential 7 during operation of the fixture. Also, during operation, the entire fixture is inserted into an oven and heated to approximately 120° C., for instance, for ¼ mil Mylar.

As may be seen, the electret material 3 is sandwiched between the two electrodes 1 and 2. This provision keeps the electret material sheet flat, wrinkle free, and free from stretching during operation of the polarizing process. In addition, before or after use, terminals 5 and 6 may be disconnected from unidirectional potential source 7, and the entire fixture may be used as a storage container for the electret material.

Insulating means 4 is shown completely covering one side of the electret material between the electrodes, and this provides spacing between electrodes 1 and 2 and a firm containment of the electret material. Thus, the possibility of short circuiting of the electrodes by touching each other around, or by punching through the electret sheet material is substantially reduced.

However, the spacing of the electrodes can be accomplished by providing insulating means which does not completely cover the electret material. Although some of the advantages of my invention will be achieved, this is not preferred as there will be wastage of the electret material which is wrinkled and due to non-homogeneous polarization.

For reasons which will be explained below, it is preferred that, but not necessarily limited to, the insulating means have a dielectric constant of larger value than the electret material.

Figure 2:
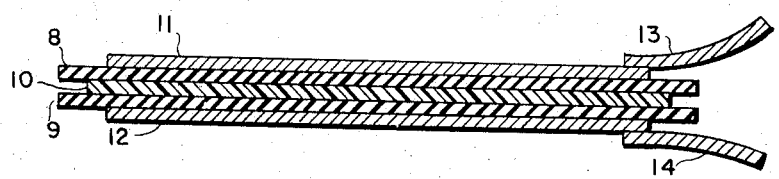
FIG. 2 shows a sectional view of the preferred embodiment of my invention.

FIG. 2 shows a sectional view of the preferred embodiment of my invention. This embodiment comprises two flat, thin and rigid insulating plates 8 and 9 having planar surfaces sandwiching electret sheet material 10. The outside opposite surfaces of the insulating plates are almost completely covered by electrodes 11 and 12. Terminals 13 and 14 provide a convenient place to connect a potential source.

In this embodiment, it may be seen that the insulating plates have substantially larger area than the electrodes. Because of the high potential applied across the electrodes during use of the fixture, current leakage could occur through the air from one electrode to the other outside the fixture. Insulating plates constructed with the periphery of at least one of the insulating plates free of electrode material creates a longer current path through the air outside the area between the electrodes, which effectively increases the resistance to superfluous current leakage. Thus it may be seen that this provision can be incorporated in the embodiment of FIG. 1 as well as that of FIG. 2.

It may also be realized that in the embodiment of FIG. 1, combinations of materials having unequal expansion rates may be used on either side of the electret material. During heating, it is readily apparent that due to this unequal expansion rate, a shearing force will be applied to the electret material sheet, causing strains. If the complete sandwich is firmly clamped together, it is possible that it will bow, similar to bimetallic strip in a thermostat, causing deformation of the electret material. For this reason, the preferred embodiment shown in FIG. 2 provides similar combinations of materials on both sides of the electret material. Therefore, insulating plates 8 and 9 which separate the electret material 10 from the electrodes 11 and 12 are symmetrical with respect to a plane drawn through the centre of the electret material sheet thickness. Therefore, the expansion rate of materials on both sides of the electret material are rendered virtually equal, preventing bending of the sandwich.

It is preferred that the insulating means have a higher dielectric constant than the electret material. The reason for this may be seen with the aid of FIG. 3 which shows diagrammatically the field strength across the thickness of the sandwich. As may be seen, the sandwich comprises electrodes 11 and 12, insulating means comprising insulating plates 8 and 9, and electret material 10. With a unidirectional potential source 7 connected to terminals 13 and 14 of the electrodes 11 and 12, an electric field 15 and 15a results across the sandwich.

Figure 3:
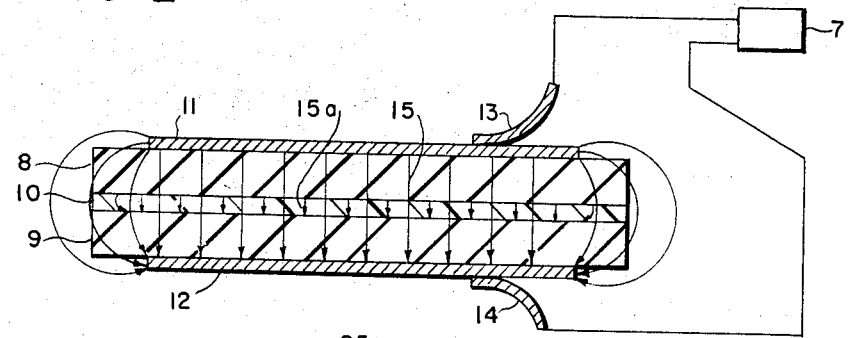
FIG. 3 is a diagrammatic method of showing the electric field strengths across the thickness of my invention during use.

An electric field applied across a series of materials having different dielectric constants will proportion itself in intensity thereacross with the highest potential gradient appearing across the material having smallest dielectric constant. Arrows 15 and 15a in FIG. 3 are intended to portray electric field vectors from one electrode to the other. It may be seen that a substantially greater number of vectors traverse electret material 10 than traverses insulating material 8 and 9. Thus, the electric field strength across the dielectric material is substantially greater than across the insulating means. This provides a more effective polarization field than if the dielectric constants of the insulating means 8 and 9 were equal to or less than the electret material. Thus, for a given electric field strength across the thickness of the electret material, a smaller-value potential source 7 is required during use of my invention with this provision than would ordinarily be expected. This provision has the further advantage of retarding the tendency for arcing and current leakage around the area between the electrodes through the air from one electrode to the other.

Calculations have shown that, although my fixture during use was clamped tightly together, an air gap of approximately the thickness of the Mylar sheet was present between the insulating plates. However, I have been unable to measure this mechanically. The figures therefore show diagrammatically the mechanical construction of my invention, and since I do not know at present all factors which contribute to the air gap and what structural form it takes, I have not shown it. However, this air gap appears to be necessary for proper operation of my fixture, but should be made as small as possible. The insulating material should be a minimum of about ten times the thickness of the air gap and preferably of the order of about 500 times the thickness thereof.

However, I have found that should the insulating means surface adjacent to the electret material be mirror smooth, the electret material adheres to the surface after the heating cycle, thus causing damage when the electret is removed. Therefore, I have found it expedient to rub these surfaces with grit No. 400A sandpaper. The resulting roughness probably contributes to the air gap. In the aforementioned references, it is indicated that this air gap may be necessary to the formation of a strongly polarized electret, by allowing a corona discharge to occur.

Figure 4:
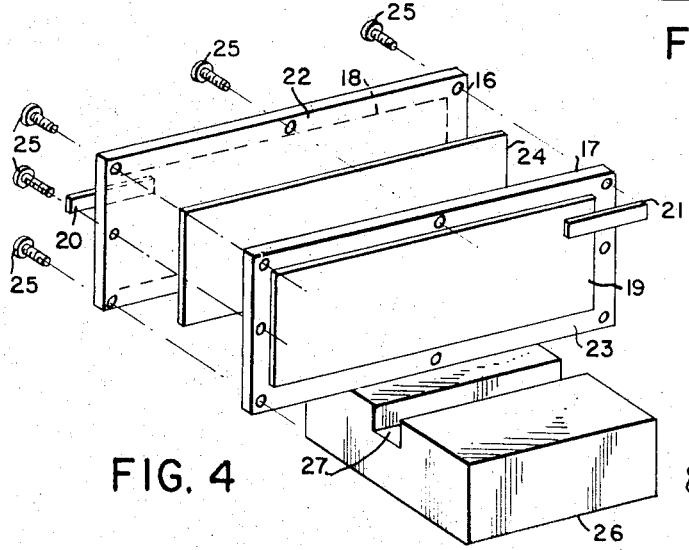
FIG. 4 shows the details of one method to construct the preferred embodiment of my invention.

FIG. 4 shows a perspective view of the preferred embodiment of my invention. In this figure, the insulating means comprises insulating plates 16 and 17. These insulating plates may be of copper clad fibrous glass-reinforced epoxy material such as that commonly used in etched form as printed circuit boards. It is preferred, in my invention, to utilize a material of which the dielectric constant is controlled so that it may be rendered virtually homogeneous and higher than the dielectric constant of the electret material. As may be seen, the insulating materials 16 and 17 are clad on one side by metal coatings 18 and 19. Terminals 20 and 21 may be soldered to the metal coatings so that they can easily be connected to a unidirectional source of potential. Strips of metal 22 and 23 are etched away from the periphery of the insulating plates to leave metal-free borders thereon. During use, electret material 24 is placed between the insulating plates to form a sandwich, and screws 25, comprised preferably of an insulating material, such as nylon, are used to clamp the sandwich together. The result is a storable, dust free enclosure for the electret material.

Sometimes, during the heating stage of the polarization process for the electret material, if the sandwich is held with its broad surface in a horizontal plane, the unsupported central section may sag and strain the electret material. In order to overcome this undesirable effect a base 26 in the form of a rectangular parallelepiped is provided with a slot 27 within its upper surface of sufficient width and depth so as to receive the sandwich and support it in a vertical position. The base, of course, is not limited to the form of a rectangular parallelepiped, the important elements being that it be preferably comprised of insulating material and that it support the sandwich with its broad plane in a vertical position. In this way, sagging of the sandwich is virtually eliminated.

The experimental model of my invention utilized Copper Clad Phenolite (trade name) grade G-11-861-1 available from the National Fibre Co. of Canada, Limited, Toronto, Ontario, and Montreal, Quebec. The dielectric constant of this material is 4.9 and the maximum operating temperature is 300° F. Therefore, it can be used conveniently with the ambient temperature of about 120° C. required for polarization. My invention was found effective in polarizing electret material comprised of ¼ mil. Mylar sheet having a dielectric constant of 3.2. I used insulating plates each ⅟₁₆ inch thick. The applied voltage was 3 to 6 thousand volts, and the charging current was $190 \times 10^{-9}$ amperes.

It may be seen that my invention can easily be used to polarize electret material of whatever shape desired simply by clamping the material within the sandwich. The insulating plates and electrodes may be made sufficiently large to encompass as large a sheet of electret material as is practically desired. The fixture provides easy handling of the electret material, since it is completely enclosing and therefore protective thereto against finger damage and oils, dust, etc. Also, because of the relatively small mass and wide homogeniety of the fixture, the temperature distribution is virtually even through its plane eliminating spots in the electret material which would be unevenly polarized due to uneven heating.

An electret formed using the preferred embodiment of my invention will be virtually homogeneously polarized over substantially all the area covered by both electrodes. Furthermore, it will not have been strained due to shearing forces across its surfaces, and because of the firm capture of the electret material within the sandwich, a metallic coating on the material will rarely peel, since uneven expansion is minimized. Thus, my fixture allows the production of an improved electret in homogeniety of polarization and surface area.

What is claimed is:

1. A fixture for polarizing electret material comprising two electrodes adapted to sandwich electret sheet material therebetween, and dielectric insulating means for separating said electret material from an electrode, the dielectric insulating means being of sufficient size to cover the electret material which is to be polarized, and having a dielectric constant of greater value than said electret material.

2. A fixture as defined in claim 1 wherein the insulating means has a surface area larger than the surface area of the one electrode and positioned so that the path length from one electrode to the other through air is substantially lengthened.

3. A fixture as defined in claim 1 wherein the surfaces of the insulating means and the other electrode next to the electret within said sandwich are virtually planar.

4. A fixture as defined in claim 1 wherein the insulating means comprises two flat, essentially rigid and thin insulating plates, one plate separating the electret material from one electrode, and the other plate separating the electret material from the other electrode.

5. A fixture as described in claim 3 wherein an electrode insulated from the electret comprises a metal coating adherently deposited on its adjacent insulating plate.

6. A fixture as defined in claim 5 wherein the dielectric insulating means comprises an insulating plate composed of fibrous glass-reinforced insulating epoxy material and the metal coating comprises copper sheet laminated with said plate.

7. A fixture for polarizing electret material comprising two flat electrodes adapted to sandwich electret material therebetween, and a virtually planar dielectric insulating plate separating the electret material from an electrode and having a dielectric constant which is greater than that of the electret material, said electrode being comprised of a metal coating adherently deposited on the dielectric insulating plate, covering the outside thereof except for a peripheral strip therearound, and further comprising clamping means for clamping the sandwich together and against the electret material so as to contain it wrinkle-free, and a base means for holding the plane of the sandwich in a vertical position during use.

8. A fixture as defined in claim 7 wherein the clamping means comprises insulating screws driven through the metallic coating-free periphery of the insulating plate, and wherein the base means comprises a rectangular parallelepiped having a slot within its upper surface, of sufficient width and depth so as to receive the sandwich and support it in a vertical position.

9. A fixture for polarizing electret material comprising: two virtually planar electrodes adapted to sandwich electret sheet material therebetween, and dielectric insulating means for separating said electret material from an electrode; said electrode comprising a metal coating adherently deposited on the dielectric insulating means, and covering the outside surface thereof except for a peripheral strip therearound; the dielectric insulating means being of sufficient size to cover the electret material which is to be polarized, and having a dielectric constant of greater value than said electret material; and further comprising clamping means for clamping the sandwich together and against the electret material so as to contain it wrinkle-free.

10. A fixture for polarizing electret material comprising two electrodes adapted to sandwich electret material therebetween, and insulating means separating the electret material from at least one electrode, the insulating means covering at least part of the electret material which is to be polarized to form an electret and having a dielectric constant which is greater than that of the electret material, each surface of the electret material being in surface contact with the insulating means or electrode disposed adjacent to it.

References Cited

UNITED STATES PATENTS

| | | | |
|---|---|---|---|
| 1,864,828 | 6/1932 | Jaffe | 204—31 |
| 1,997,263 | 4/1935 | Meissner | 313—108 |
| 2,740,184 | 4/1956 | Thomas | 250—49.5 |
| 2,844,731 | 7/1958 | Plonsky et al. | 250—49.5 |

OTHER REFERENCES

G. Gross: "Experiments on Electrets," Physical Review, vol. 6, No. 2, pp. 26–28, July 15, 1944.

B. Gross: "On Permanent Charges in Solid Dielectrics," J. Chem. Physics, vol. 17, No. 10, pp. 866–872 October 1949.

BERNARD KONICK, *Primary Examiner.*

IRVING L. SRAGOW, *Examiner.*

A. F. BERNARD, J. F. BREIMAYER,
*Assistant Examiners.*